United States Patent [19]
Lovera et al.

[11] 4,369,019
[45] Jan. 18, 1983

[54] HELICOPTER ROTOR COMPRISING ELASTOMER JOINTS

[75] Inventors: Bruno Lovera, Cardano; Santino Pancotti, Gallarate, both of Italy

[73] Assignee: Costruzioni Aeronautiche Giovanni Agusta S.p.A., Italy

[21] Appl. No.: 245,721

[22] Filed: Mar. 20, 1981

[30] Foreign Application Priority Data

Apr. 3, 1980 [IT] Italy ................ 67517 A/80

[51] Int. Cl.³ .......................................... B64C 27/38
[52] U.S. Cl. ................... 416/134 A; 416/141
[58] Field of Search ............ 416/141, 134 A, 140 A, 416/138 A

[56] References Cited
U.S. PATENT DOCUMENTS

| | | | |
|---|---|---|---|
| 4,017,043 | 4/1977 | Barzda | 416/134 A |
| 4,053,258 | 10/1977 | Mouille | 416/138 A |
| 4,257,739 | 3/1981 | Covington | 416/134 A |
| 4,304,525 | 12/1981 | Mouille | 416/140 A |

Primary Examiner—Robert W. Jenkins
Attorney, Agent, or Firm—Kane, Dalsimer, Kane, Sullivan and Kurucz

[57] ABSTRACT

A helicopter rotor comprising elastomer joints, in which each blade is connected to a rotatable hub by means of a yoke constituted by a single U-shaped piece and mounted through a relative aperture provided in said hub;
  each yoke being connected to a transverse arm outwardly bordering said aperture, by means of a U stirrup embracing the relative said arm and provided with two overlying appendices extending outwards and having two surfaces inclined towards the other and acting as stop surfaces for two rocker arms constituting a device
  for controlling the flapping movements of said blade; said two rocker arms being mounted rotatable in a substantially vertical plane passing through the axis of the relative blade and being supported by a lever for controlling the pitch of this latter.

8 Claims, 5 Drawing Figures

4,369,019

HELICOPTER ROTOR COMPRISING ELASTOMER JOINTS

BACKGROUND OF THE INVENTION

This invention relates to a helicopter rotor comprising elastomer joints.

In particular this invention relates to a helicopter rotor comprising elastomer joints, which comprises a main shaft provided upperly with a hub in the form of a flat polygonal member extending radially outwards from said main shaft and rigid therewith, said hub comprising a plurality of through apertures closed outwardly by a transverse arm and supporting, at each of said apertures, a blade extending outwards in a substantially radial direction and connected to said hub by means of a yoke extending through the relative said aperture and connected to the relative said arm by means of an elastomer joint; lever means being rigidly connected to each of said yokes and to each of said blades in order to vary the pitch thereof.

In the description given hereinafter, a rotor of the type heretofore defined is indicated by the term "rotor of the type specified".

In known rotors of the type specified, each yoke which connects the blades to the hub of the main shaft is normally constituted by two superposed plates connected at one end to a respective elastomer joint disposed between the yoke and said hub, and connected at the other end to an inner end of the relative blade. Between said two superposed plates a device is normally disposed for controlling the flapping movements of the blade, this device generally comprising a spherical head arranged to selectively engage, according to the angular speed of the main shaft, a plurality of spherical seats provided in a member rigid with the blade.

Although known rotors of the aforesaid type are relatively functional, they have the drawback of possessing a structure which is not particularly compact because of the manner in which their yokes are constructed. Moreover, the concave and convex surfaces which cooperate in controlling the blade flapping movements are relatively delicate and easily deteriorated by external agents.

Finally, the presence of said concave and convex surfaces, the formation of which requires highly complex and precise machining, considerably increases the manufacturing cost of the rotor.

SUMMARY OF THE INVENTION

The object of the present invention is to provide a helicopter rotor which is substantially free from the aforesaid drawbacks.

The aforesaid object is attained according to the present invention by a helicopter rotor comprising elastomer joints of the type specified, in which said yoke is constituted by a single substantially U-shaped piece comprising an intermediate curved portion extending through the relative said aperture and disposed with its concavity facing the relative said arm, first and second connection means being provided for connecting each of said elastomer joints to the relative said intermediate curved portion and to the relative said arm respectively; and in which said lever means define, between two opposing arms of the relative said yoke and together with said second connection means, a chamber housing a device for controlling the flapping movements of the relative said blade; said control device comprising two rocker members supported by said lever means and rotatable, against the action of resilient means, about a substantially horizontal axis perpendicular to the axis of the relative blade; each of said rocker members being arranged to cooperate with a relative first stop surface carried by said second connection means and a second stop surface carried by said lever means.

BRIEF DESCRIPTION OF THE DRAWINGS

Further characteristics and advantages of the present invention will be apparent from the description given hereinafter with reference to the accompanying drawings which illustrate a nonlimiting example thereof, and in which.

DETAILED DESCRIPTION OF THE INVENTION

Figure 1:
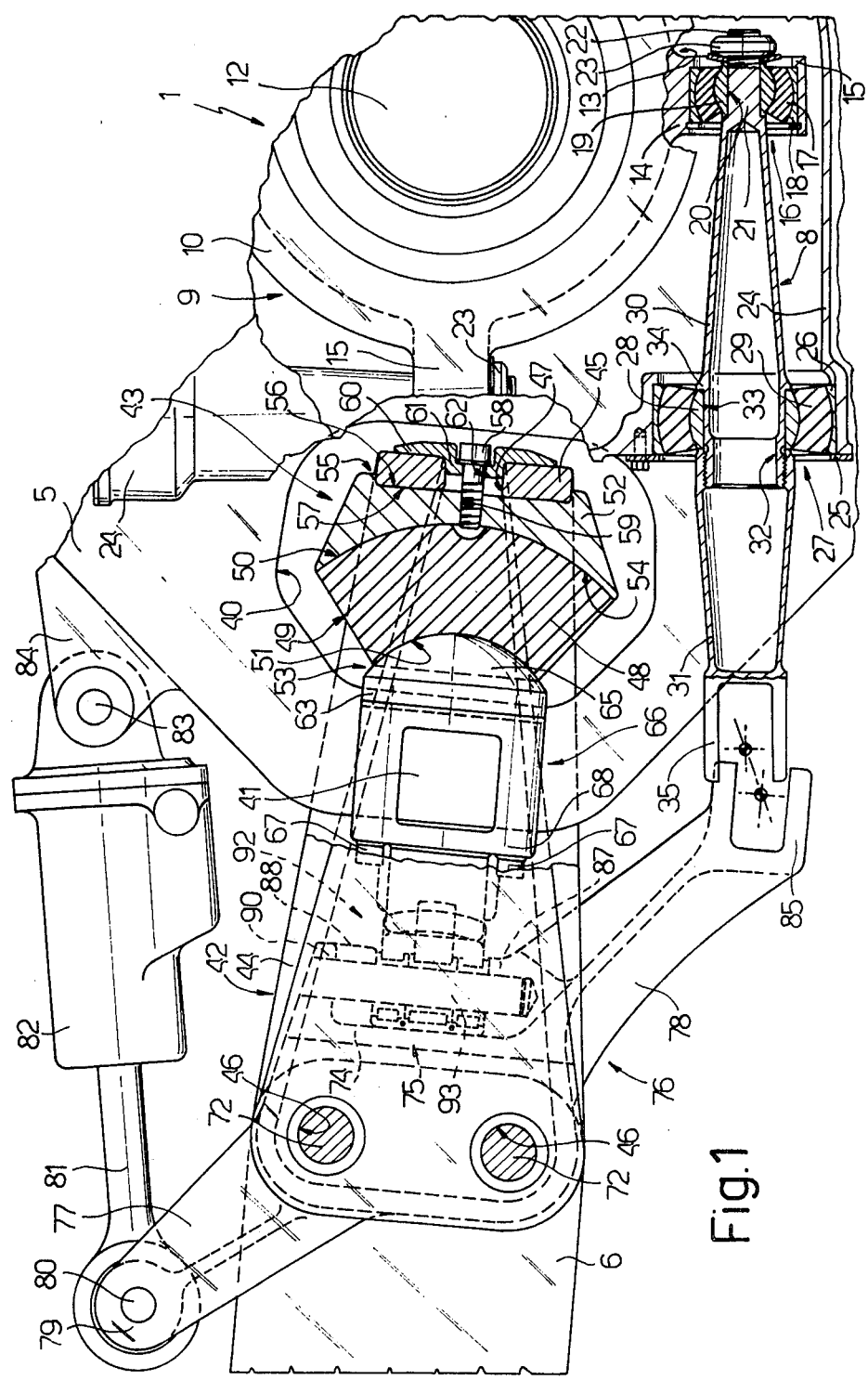
FIG. 1 is a plan view, with parts in section and parts removed for clarity, of a helicopter rotor constructed according to the present invention.
Figure 2:
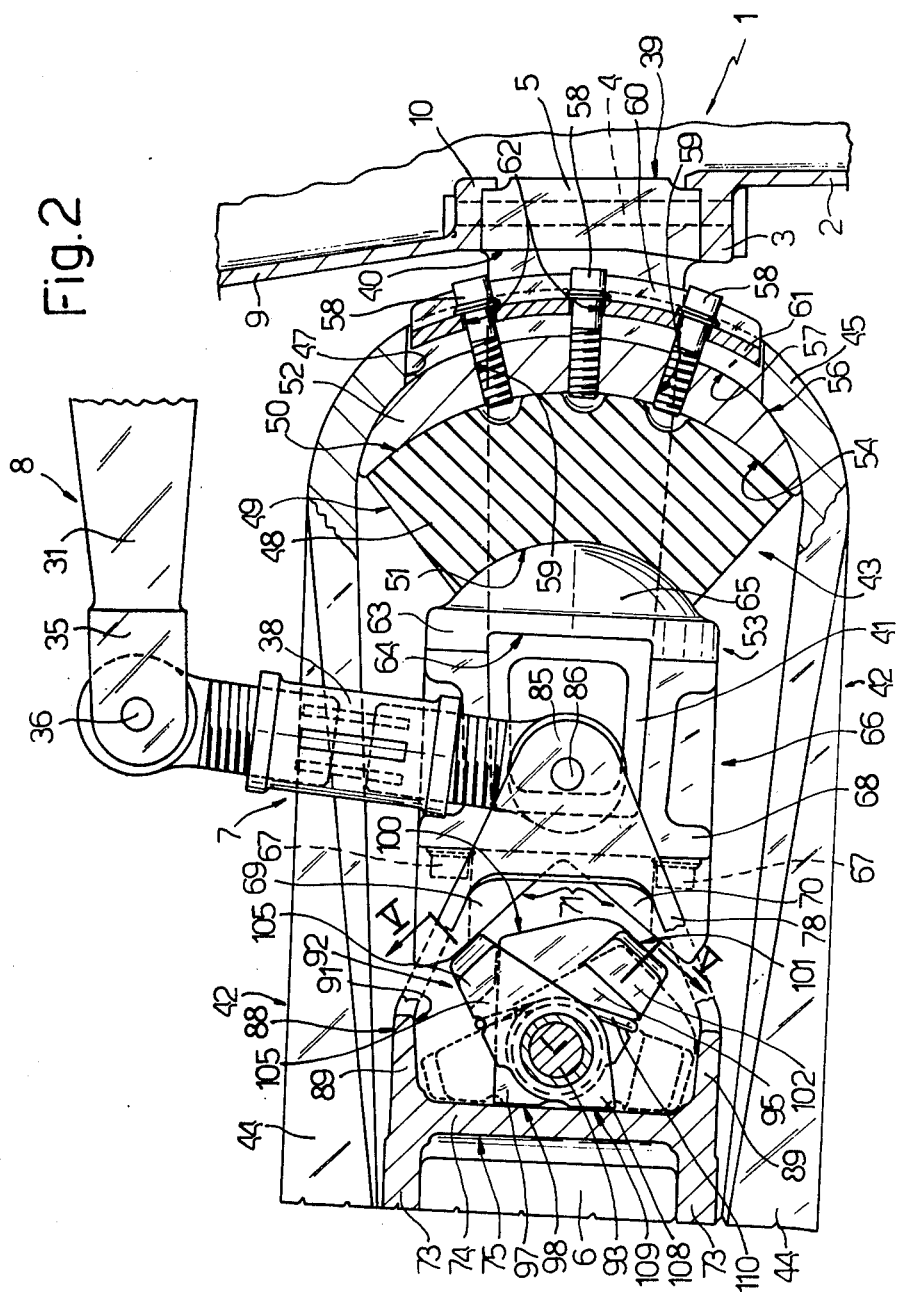
FIG. 2 is a section on the line II—II of FIG. 1.

FIGS. 1 and 2 show a rotor shaft 1 extending vertically upwards from a reduction gear box, not shown, connected to the exit of a drive unit, not shown.

The rotor shaft 1 comprises a tubular main rotor (FIG. 2) of substantially cone frustum shape, of which the lower end (not shown), of smaller cross-section, is supported rotatably by a casing (not shown) of said reduction gear box, and is angularly coupled to the exit (not shown) of this latter.

At its upper end, the shaft 2 comprises an annular flange 3 traversed by bolts 4 for connecting the shaft 2 to a hub 5, from which a plurality of blades 6 extend outwards. The pitch of each of these latter is controlled, as described in detail hereinafter, by means of a connecting rod 7 (FIG. 2), one end of which is connected to a respective rocker arm 8 extending in a radial direction through a cup-shaped head 9. This latter is provided with a lower annular flange 10 connected to the hub 5 and to the flange 3 by the bolts 4, and comprises an internal compartment 11 traversed by a fixed tubular shaft 12 (FIG. 1), the lower end (not shown) of which is coupled by means of a splined coupling, not shown, to the casing (not shown) of said reduction gear box.

Inside the head 9, the shaft 12 supports a "swivel plate" assembly 13 comprising an outer rotatable ring 14 mobile both axially and angularly about a horizontal axis relative to the shaft 12, its axial position and inclination relative to this latter being respectively controllable, in known manner, by the linkages (not shown) operated by means of a bar (not shown) for controlling the collective pitch, and a bar (not shown) for controlling the cyclic pitch of the blades 6.

Axially bored cylindrical bushes 15 project radially outwards from the rotatable ring 14 (FIG. 1), they being rigid with the ring 14 and each having a horizontal axis disposed substantially tangential to the outer periphery of the ring 14.

Each bush 15 is coupled to the end of a respective rocker arm 8 by means of an elastomer joint 16 comprising a hollow spherical sleeve 17 constituted of elastomer material, the outer surface of which is coupled to the inner spherical surface of a bush 18 rigid with the inner surface of the bush 15, and the inner surface of which is coupled to the outer surface of a spherical member 19. This latter has an axial through bore 20 engaged by a cylindrical portion 21 of the rocker arm 8, which comprises a threaded end portion 22 engaged by a ring nut 23 for axially fixing the spherical member 19 on to the portion 21 of the rocker arm 8.

Each rocker arm 8 extends from the rotatable ring 14 in a direction substantially tangential to the outer periphery thereof, and emerges from the head 9 through a respective cylindrical bush 24, in which there is axially fixed, by means of an outer ring 25, a second cylindrical bush 26 internally comprising a spherical surface and constituting the outer member of an elastomer joint 27. This latter comprises internally a spherical member 28 coupled to the inner spherical surface of the bush 26 by way of a spherical sleeve 29 constituted of elastomer material. The spherical member 28 is connected to the rocker arm 8 by two arms 30 and 31 constituting the rocker arm 8, and joined together by a threaded telescopic coupling 32.

The spherical member 28 has a central through bore 33 engaged by a cylindrical portion of the arm 30, and is urged by the arm 31 into contact with an annular projection 34 carried by the arm 30.

At its free end, the arm 31 comprises a fork 35 to which the upper end of the relative connecting rod 7, the length of which can be adjusted by means of a central turnbuckle 38, is hinged by means of a through pin 36 (FIG. 2).

As shown in FIGS. 1 and 2, the hub 5 is substantially constituted by a box member having in plan view a substantially polygonal form and comprising a central axial through bore 39 (FIG. 2), through which the shaft 12 extends. The hub 5 has a plurality of axial peripheral through apertures 40, each of which is disposed in a position corresponding with a respective blade 6, and is bounded outwardly, towards this latter, by a bridge arm 41 of box construction.

The connection between each blade 6 and the hub 5 is made by a yoke 42 extending through the relative aperture 40, this yoke being rigidly connected to one end or root of the respective blade 6, and coupled to the relative arm 41 by means of an elastomer joint indicated overall by 43.

Figure 3:
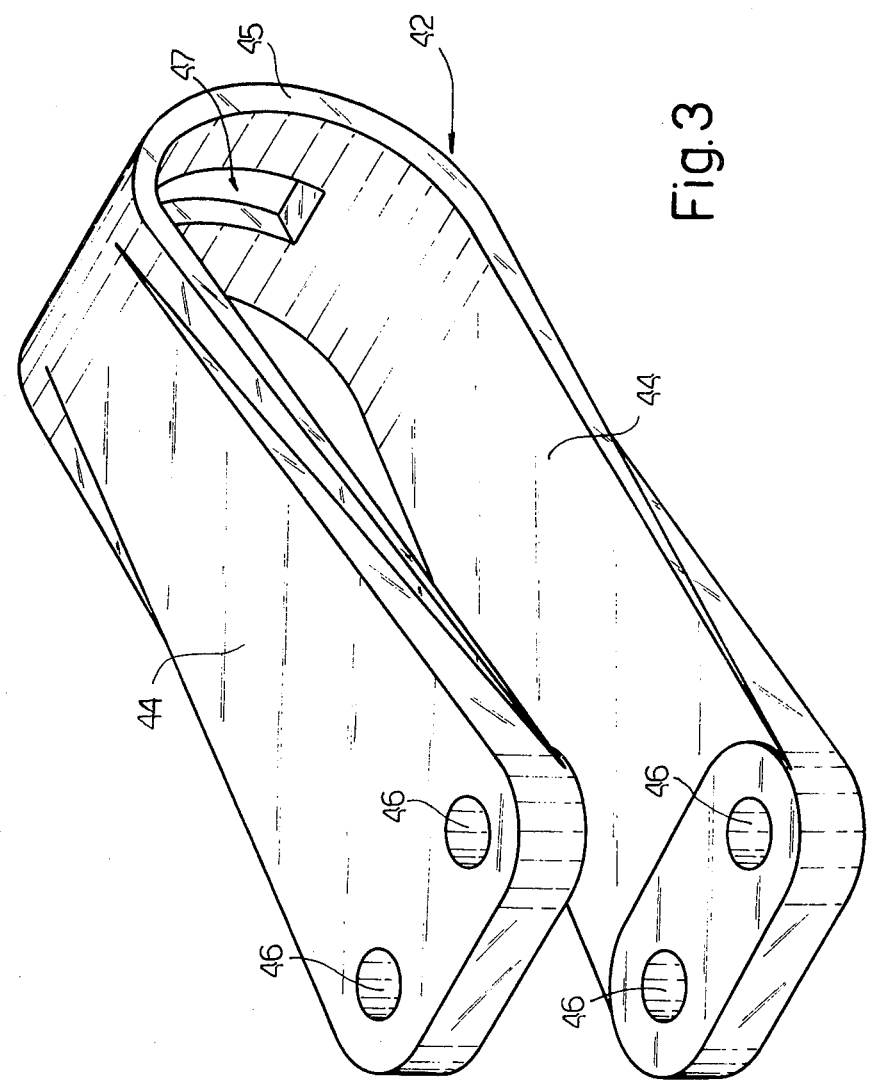
FIG. 3 is a perspective view illustrating a first detail of FIGS. 1 and 2 to an enlarged scale.

As shown in particular in FIG. 3, each yoke 42 is in the form of a single substantially U-shaped body and comprises two superposed arms 44, each in the form of a substantially trapezium-shaped flat plate and joined together at their minor bases by a curved member 45 extending through the relative aperture 40. Each arm 44 comprises two through bores 46 in proximity to its major base, and the curved member 45 comprises a central axial slot 47 extending in a substantially vertical plane.

As shown in FIGS. 1 and 2, the elastomer joint 43 comprises a block 48 of elastomer material bounded laterally by a cone frustum surface 48, the major base of which is constituted by a convex spherical cap surface 50, and the minor base of which is constituted by a concave spherical cap surface 51 concentric with the surface 50.

The elastomer joint 43 also comprises an outer member or shoe 52 and an inner member or shoe 53 rigid with the block 48.

In particular, the outer shoe 52 is bounded on one side by a spherical surface 54 rigidly connected to the surface 50 of the block 48 by vulcanisation, and on the other side by a substantially cylindrical curved surface 55 with a central groove 56 (FIG. 1), of which the convex curved base surface extends in contact with a concave curved internal surface 57 of the curved element 45. The coupling contact between the convex surface of the groove 56 and the concave surface 57 is ensured by a plurality of screws 58 extending through the slot 47 and engaging respective threaded bores 59 provided in the outer shoe 52 in order to connect to this latter a curved plate 60, which is disposed in contact with the outer curved surface of the curved element 45, and comprises an axial rib 61 extending inside the slot 47 and traversed by bores 62, each engaged by a respective screw 58.

The inner shoe 53 comprises a plate 63 having on one side a substantially horizontal groove 64 engaged by the inner lateral periphery of the relative arm 41, and on the other side a spherical head 65 rigidly connected to the surface 51 of the block 48 by vulcanisation. The connection between the plate 63 and the relative arm 41 is ensured by a U-shaped stirrup 66 mounted from the outside on said arm 41 and connected to the plate 63 by screws 67. The stirrup 66 comprises a core 68 disposed in contact with the outer lateral surface of the relative arm 41, and two superposed appendices 69 and 70 extending outwards in a direction substantially radial to the hub 5, these being bounded by two inclined surfaces 71 which face each other and are connected to each other to define a substantially rectangular dihedral with its corner extending in a substantially horizontal direction perpendicular to the axis of the relative blade 6.

The connection between the root of each blade 6 and the relative yoke 42 is made by two pins 72 extending through the bores 46 and engaged in respective through bores (not shown) provided through said root and through two plates 73 disposed between the arms 44 and said root, and connected together by a vertical plate 74 disposed facing the end of said root and constituting with the plates 73 a U-shaped stirrup 75.

The stirrup 75 constitutes the intermediate part of a double lever 76 (FIG. 1) comprising two arms 77 and 78 substantially aligned with each other and disposed in a substantially horizontal plane in a position inclined to the relative blade 6, and of which the first extends outwards and comprises at its end a fork 79 on which is hinged, by means of a pin 80, the end of an exit rod 81 of a shock absorber, of which the body 82 is hinged by a pin 83 to a stirrup 84 rigid with the head 9; the second arm extending towards the hub 5 and having at its end a fork 85 to which the lower end of the relative connecting rod 7 is hinged by a pin 86 (FIG. 2).

The plate 74 and a portion for connecting the arm 78 to the plate 74 constitute respectively a base wall and a side wall 87 of a cup member 88 which is coaxial to the relative blade 6 and has its concavity facing the hub 5. The cup member 88 comprises, in addition to the walls 74 and 87, two substantially horizontal side walls 89 and a wall 90 (FIG. 1) opposite the wall 87.

The cup member 88 is disposed facing the appendices 69 and 70, and, together with the inclined surfaces 71 thereof, define a chamber 91 in which there is housed a device 92 for controlling the flapping angles of the relative blade 6.

Figure 5:
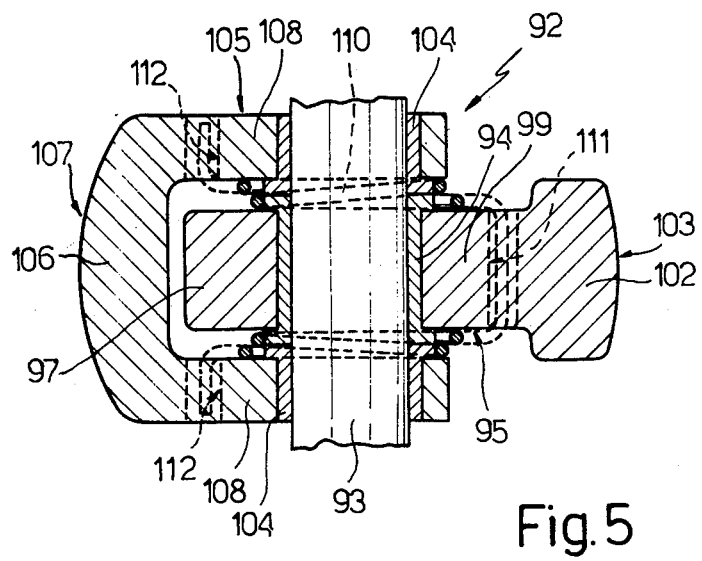
FIG. 5 is a section on the line V—V of FIG. 2.
Figure 4:
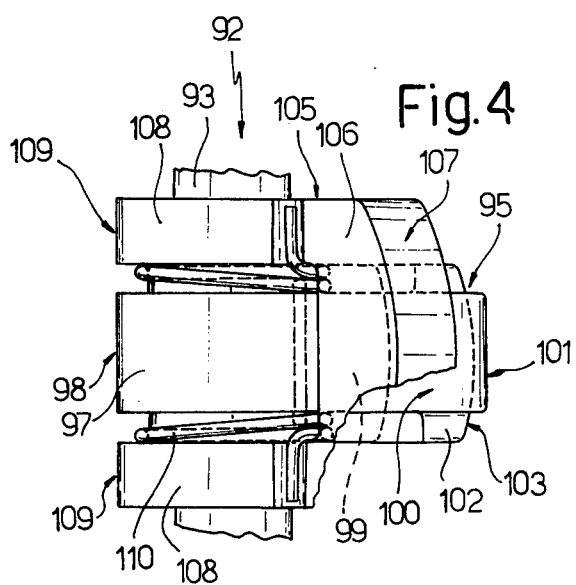
FIG. 4 is a perspective view from above illustrating a second detail of FIGS. 1 and 2 to an enlarged scale.

As shown in FIG. 2 and, in particular, in FIGS. 4 and 5 the device 92 comprises a pin 93 disposed in a substantially horizontal position between the walls 87 and 90, and rotatably supporting by way of a bearing 94 a rocker arm 95 constituted by a plate defining a first arm 97 of small dimensions which normally faces the wall 74 and is bounded laterally by a flat surface 98 (FIG. 2), and a second arm 99 extending towards the dihedral formed by the surfaces 71 and bounded at its end by two surfaces 100 and 101 (FIG. 2) which join together to form between them an angle greater than 90°. In particular, at the surface 101, the arm 99 forms a transverse hammer head 102 bounded externally by a cylindrical surface 103 with its axis perpendicular to that of the pin 93.

On the pin 93, on opposite sides of the bearing 94, there are rotatably mounted two further bearings 104 (FIG. 5) of a U-shaped double rocker arm 105 comprising a cross member 106 facing the surface 71 of the appendix 69 and bounded externally by a curved surface 107 with its axis perpendicular to that of the pin 93, and two arms 108 extending from the opposing ends of the surface 107 towards the wall 74 and each terminating in a flat surface 109. The rocker arm 105 has a moment of inertia exceeding that of the rocker arm 95, and a length such that this latter cannot pass below the cross member 106, and is disposed normally in contact therewith under the thrust of a spiral spring 110 wound about the pin 93 and engaging by means of its intermediate portion a through bore 111 provided in the arm 99 of the rocker arm 95, and further engaging by means of its end portions two through bores 112 provided in the arms 108.

In operation, when the main shaft 2 is at rest, the two rocker arms 95 and 105 are disposed substantially in contact with each other in a rest position shown in FIG. 2, under the thrust of the spring 110. In this rest position, the surfaces 98 and 109 of the rocker arms 95 and 105 are disposed in a coplanar position with each other and in contact with the inner surface of the base wall 74 of the cup member 88, this latter surface acting as a first stop surface for the rocker arms 95 and 105. By virtue of its weight, each blade 6 bends the relative block 48 until the rocker arm 95 comes into contact by way of its surface 101 with the surface 71 of the appendix 70, which acts as a second stop surface for the rocker arm 95, thus halting the downward movement of the relative blade 6. This support for the blade 6 is ensured, whatever its pitch, by the presence of the head 102, the surface 103 of which extends in the form of a circular arc in a direction transverse to the surface 101.

When the main shaft 2 begins to rotate, thus rotating the blades 6, these latter, if suitably disposed so as to generate a certain power, tend to rotate upwards about the centre of the elastomer joint 43, causing the surface 101 to separate from the surface 71 of the appendix 70, and causing the surface 107 of the rocker arm 105 to make contact with the surface 71 of the appendix 69, which acts as a second stop surface for the rocker arm 105 and limits to a determined value the upward flapping angle of the blade 6 at low speed.

As clearly illustrated in FIG. 2, when the surfaces 98 and 109 of the rocker arms 95 and 105 are disposed in contact with the wall 74, the rocker arms 95 and 105 are in a crossed disposition, and those ends thereof which are distant from the relative surfaces 98 and 109 extend outside these latter, so that by the effect of the centrifugal force which is developed during the rotation of the shaft 2, they tend to rotate about the pin 93, the first in a clockwise and the second in an anticlockwise direction in FIG. 2, against the action of the spring 110, until they reach the positions indicated by dashed lines in FIG. 2. In particular, because of the stated fact that the rocker arm 105 has a moment of inertia exceeding that of the rocker arm 95, there is a first angular speed of the rotor 1 for which the rocker arm 105 begins to move angularly in an anticlockwise direction until it no longer cooperates with the appendix 69, while the rocker arms 95 still remains at rest. In other words, when the rotor 1 exceeds the said first angular speed, any upward flapping limitation on the blade 6 is removed, whereas downward flapping remains strictly controlled within a relatively small angle by the rocker arm 95, which is still disposed with its surface 101 facing the surface 71 of the appendix 70.

Finally, there is a second rotational speed, exceeding the said first rotational speed, for which the rocker arm 95 also rotates, to move, clockwise in FIG. 2, towards the wall 74 and dispose its surface 100 in a position facing the surface 71 of the appendix 70. As shown in FIG. 2, because of the fact that the distance of the surface 100 from the axis of the pin 93 is less than the distance between this latter and the surface 101, the downward flapping angle which is permitted to each blade 6 increases until it reaches a maximum value determined when the said second angular speed is exceeded.

One characteristic of the described rotor 1 which should be stated is the presence of the double lever 76, which performs a plurality of tasks which, in known rotors, are normally performed individually by respective separate mechanical members.

In particular, the double lever 76 enables the arms 44 of the yoke 42 to be connected together, so locking relative to this latter the root of the respective blade 6, and connects this latter, by way of its arm 78, to the respective rocker arm 8 by means of the connecting rod 7, thus making it possible to transmit the pitch control movements to the blade 6.

By means of its arm 77, the double lever 76 also enables the respective blade 6 to be connected to the hub 5 by way of the relative shock absorber 81-82.

Finally, between the arms 77 and 78 and inside the yoke 42, the double lever 76 defines the cup member 88, the side walls of which not only support but also give protection from external agents to the control device 92 for the flapping angles of the relative blade 6, and of which the base wall constitutes a stop surface for the two rocker arms 95 and 105.

Within the principle of the invention, numerous modifications can be made to the described rotor 1 without leaving the scope of the inventive idea.

What we claim is:

1. A helicopter rotor (1) comprising elastomer joints, which comprises a main shaft (2) provided upperly with a hub (5) in the form of a flat polygonal member extending radially outwards from said main shaft (2) and rigid therewith, said hub (5) comprising a plurality of through apertures (40) closed outwardly by a transverse arm (41) and supporting, at each of said apertures (40), a blade (6) extending outwards in a substantially radial direction and connected to said hub (5) by means of a yoke (42) extending through the relative said aperture (40) and connected to the relative said arm (41) by means of an elastomer joint (43); lever means (76) being rigidly connected to each of said yokes (42) and to each of said blades (6) in order to vary the pitch thereof; characterised in that said yoke (42) is constituted by a single substantially U-shaped piece comprising an intermediate curved portion (45) extending through the relative said aperture (40) and disposed with its concavity facing the relative said arm (41), first and second connection means (58-60, 66-67) being provided for connecting each of said elastomer joints (43) to the relative said intermediate curved portion (45) and to the relative said arm (41) respectively; and in that said lever means (76) define, between two opposing arms (44) of the relative said yoke (42) and together with said second connection means (66, 67), a chamber (91) housing a device (92) for controlling the flapping movements of the relative said blade (6); said control device (92) comprising two rocker members (95, 105) supported by said lever means (76) and rotatable, against the action of resilient means (110) about a substantially horizontal axis (93) perpendicular to the axis of the relative blade (6); each of said rocker members (95, 105) being arranged to cooperate with a relative first stop surface (71) carried by said second connection means and a second stop surface (74) carried by said lever means.

2. A rotor as claimed in claim 1, characterised in that each of said elastomer joints (43) comprises a block (48) of elastomer material of substantially cone frustum shape having a major base (50) in the form of a convex spherical cap and a minor base (51) in the form of a concave spherical cap; an inner shoe (53) comprising a head (65) in the form of a substantially flat spherical cap (63) and rigidly connected to said minor base (51); and an outer shoe (52) constituted by a curved plate bounded on one side by a concave spherical cap surface (54) rigidly connected to said major base (50), and on the other side by a substantially cylindrical convex curved surface (56) coinciding with a concave curved internal surface (57) of said intermediate curved portion (45) of said yoke (42).

3. A rotor as claimed in claim 2, characterised in that said first connection means comprise an outer curved plate (60) disposed in contact with an outer convex curved surface (56) of said intermediate curved portion (45), and screw means (58) extending through said outer curved plate (60) and said outer shoe (52) and through a substantially vertical slot (47) provided in said intermediate curved portion (56) of said yoke (42).

4. A rotor as claimed in claim 2, characterised in that said second connection means comprise a substantially U-shaped stirrup (66) embracing from the outside the relative said arm (41) of said hub (5) and connected in a demountable manner to said plate (63) of the relative said inner shoe (53); said stirrup (66) comprising two superposed appendices (69, 70) extending outwards in a direction substantially radial to said hub (5) and carrying the said two second stop surfaces (71); these latter defining a substantially right dihedral with its concavity facing outwards and its corner substantially parallel to the axis of rotation (93) of the relative said two rocker members (95, 105).

5. A rotor as claimed in claim 4, characterised in that said lever means (76) comprise a cup member (88) coaxial to the relative said blade (6) and with its concavity facing the relative said arm (41) of said hub (5); two side walls (87, 90) of said cup member (88) supporting a pin (93) which rotatably supports said two rocker members (95, 105), and an inner surface of a base wall (74) of said cup member (88) constituting said first stop surface.

6. A rotor as claimed in claim 5, characterised in that each rocker member (95, 105) comprises a first arm, and a second arm of length exceeding that of the first arm; said rocker members being disposed in a crossed arrangement and being rotatable between a first angular rest position in which their said first arm faces said first stop surface (74) and their said second arm faces the relative said second stop surface (71), and a second angular working position in which said rocker members (95, 105) are disposed with their second arm laterally in contact with said first stop surface (74).

7. A rotor as claimed in claim 6, characterised in that the second arm (99) of a first (95) of said rocker members directed towards the second lower stop surface (71-70) is bounded by two surfaces (100, 101) which join together to form a contained angle exceeding 90°, and which are disposed at different distances from the axis of rotation of said first rocker member (95).

8. A rotor as claimed in claim 7, characterised in that said first rocker member (95) has a moment of inertia which is less than that of the other said rocker member (105).

* * * * *